Sept. 15, 1942.   C. J. MERRIAM   2,295,744
CONTROLLING VACUUM DRYING
Filed March 29, 1940
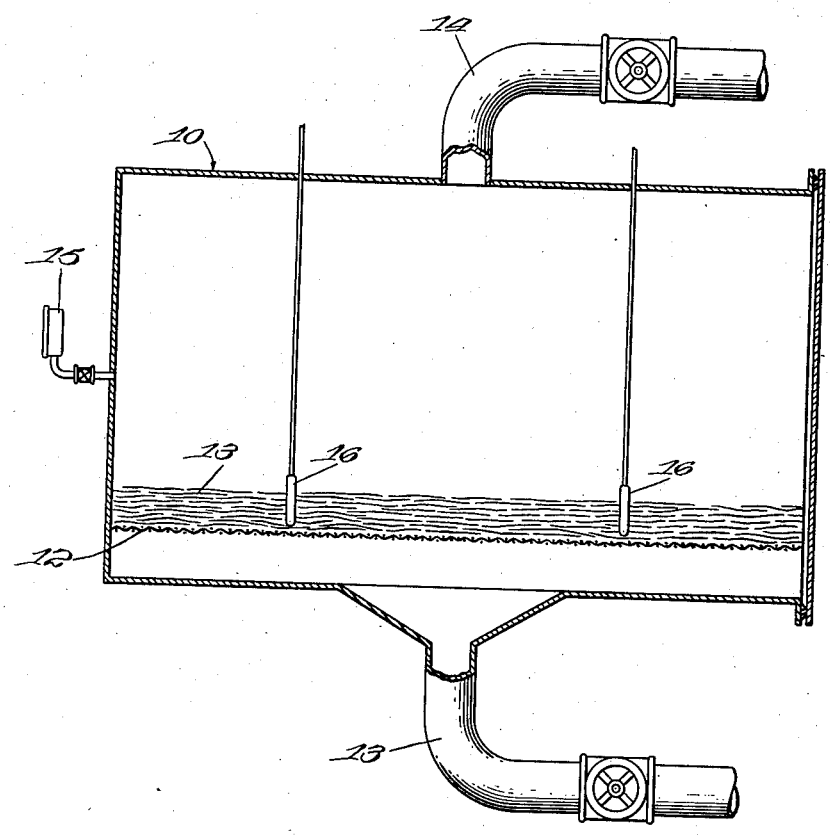
Inventor:
Charles J. Merriam.
By Chritton, Wiles, Davies, Hirschl & Dawson
Attys.

Patented Sept. 15, 1942

2,295,744

UNITED STATES PATENT OFFICE 2,295,744

CONTROLLING VACUUM DRYING

Charles J. Merriam, Winnetka, Ill., assignor to The Guardite Corporation, a corporation of Illinois Application March 29, 1940, Serial No. 326,721

2 Claims. (Cl. 34—15)

This invention relates to the control of vacuum drying and more particularly to vacuum drying in which the drying medium is superheated steam.

In drying materials, for example, organic products such as rayon, tobacco, and the like, under vacuum conditions, one of the difficulties involved is the control of the final moisture content. In view of the maintenance of a vacuum, the taking of samples is difficult, and on account of the fact that the initial moisture content may vary widely in different samples of the same product and even throughout the same batch under treatment, it is difficult to estimate the required treatment from experience. Moreover, where the product has different moisture contents in different parts, certain types of vacuum drying with superheated steam will not produce the necessary equilibrium, as for example, where a steady steaming operation is employed rather than a succession of cycles of steaming and evacuation.

It has now been discovered that these difficulties may be overcome to the extent that the initial moisture content of the product can be disregarded as well as any variations in water content throughout the body under treatment. This result is accomplished preferably by carrying out the drying under constant pressure and controlling the operation by regulating the rise in temperature of the product permitted under this set of conditions. The same results may be accomplished, however, by maintaining the temperature of the product constant and increasing the vacuum to a predetermined point. It may also be done with more difficulty by varying both pressure and temperature to approach a given conjunction of the two.

The interposition of evacuation cycles does not disturb the principle or operation of the above process.

The invention is illustrated diagrammatically, so far as it is possible to illustrate the invention, in the drawing in which 10 represents a container adapted to be evacuated, 11 represents a line leading to evacuating means which are not shown, 12 represents a screen within the container, and 13 represents a thin layer of wet material upon the screen. Steam may be admitted to the container 10 through the line 14. The container is also provided with a pressure gauge 15 and one or more thermometers 16 are maintained within the layer of material to be dried. These thermometers are preferably recording thermocouples.

The process of the present application depends upon the utilization of the relationship between water vapor pressure and temperature and moisture content of any given product. It is of course known that every hygroscopic product will exert a given water vapor pressure at a particular temperature. Applicant, however, was the first to realize that this known fact could be made use of to control drying either under a vacuum or not. If a substance will exert a 6" vapor pressure at 140° F. when containing 10% of water, applicant realized that if the substance were held under 6" of steam pressure and the temperature gradually increased to 140° F., that when it reached that temperature its moisture content would be 10% regardless of how much moisture the product had at the beginning of the treatment.

When stated in this simple form the above proposition appears to be a converse hypothesis which should have been easily ascertainable by the art. Nevertheless, it was never grasped by anyone skilled in the art. Probably this is because engineers have been confused by the differing amounts of heat input required for different amounts of moisture removed, and by the different amounts of heat input required where the objects have different starting temperatures. It is also confusing because the proposition is true only where the product is allowed to be at equilibrium under these conditions, and where the atmosphere is one exclusively of steam.

Let us assume the case of a product which has a 6" vapor pressure at 140° F. when containing 10% of moisture. Let us also assume that the product contains an indeterminate amount of moisture greater than 10%, and has a lower temperature than 140° F. The product is treated to remove all of the air and establish an atmosphere of steam. This likewise is an important part of the process because, if any air is present, all of the calculations are thrown off. In order to remove the air it is preferred to follow the process of the patent of applicant and Russell Wiles, 2,080,179. During that process the pressure on the product is lowered far below 6" and its temperature will be also reduced. Thereafter a steam pressure is established on the product of 6". Inasmuch as the product has more than 10% of moisture, it can support more than 6" of pressure at 140° F. and, therefore, its temperature in the beginning will be below 140° F. and it will rise only as the product dries. The heat for drying may be introduced in a number of ways and preferably by superheated steam.

The introduced heat goes mostly toward removing moisture and the temperature rise of the product is very slow, but at each stage the temperature of the product will correspond to a given moisture content of the product under the particular pressure. By stopping at 140° F., this content will be 10%. If the process were stopped at 135° F., it might be 15%. Conversely, at 150° F., it might be 7%.

In practicing the process of this invention, the initial moisture content of the material has proved to be of no importance. For example, rayon having an initial moisture content of 100% on a dry basis will dry to a moisture content of 10% under the same final conditions as rayon having an initial moisture content of only 20%. The difference is automatically taken care of by shortening of the time. That is, with a wet rayon the time necessary to increase the temperature to a predetermined point under constant pressure conditions will be much greater than with a dry rayon, but both types will respond to precisely the same control.

The exact temperature-pressure relationships vary with the type of product undergoing treatment but may be readily tested for it and, once determined, may be used for regulating all future operations with that material.

For example, when rayon is employed, a wet mass of rayon of indeterminate moisture content is subjected to a vacuum to remove non-condensible gases. Superheated steam is then introduced at a constant sub-atmospheric pressure and this is continued until the temperature of the product reaches the temperature corresponding with the desired final moisture content. This will be the same regardless of the initial moisture content.

Instead of starting with a predetermined pressure and maintaining it until the temperature has risen to a predetermined point, the product may be brought to the desired final temperature and the pressure gradually lowered to maintain the temperature. This method is not as desirable as the one first outlined because with most products the imposition of the high temperature should be for as short a time as possible. Furthermore, the control of the system is not as easy to carry out manually. Automatically, it may of course be taken care of by appropriate instruments.

It is of course possible to vary both temperature and pressure to reach the desired conjunction of the two, but from an operating standpoint this is less desirable than either of the others, since it involves two variables.

The foregoing detailed description has been given for clearness of understanding only, and no unnecessary limitations should be understood therefrom.

What I claim as new, and desire to secure by Letters Patent, is:

1. The method of drying a hygroscopic product which comprises substantially removing non-condensible gases therefrom, passing superheated steam over the product at a selected sub-atmospheric pressure, the temperature of the steam being higher than the temperature of the product, and continuing passage of the steam over the product until the temperature of the product reaches a predetermined value below that of the steam, at which temperature the vapor pressure of the moisture in the product is in equilibrium with the steam pressure and at which temperature the product retains a desired percentage of moisture as determined from a vapor pressure curve of the product at the selected temperature.

2. The method as set forth in claim 1 in which the product is rayon.

CHARLES J. MERRIAM.